(12) United States Patent
Cocco et al.

(10) Patent No.: US 6,763,905 B2
(45) Date of Patent: Jul. 20, 2004

(54) VEHICLES HAVING TWO FRONT ROLLING AND STEERING WHEELS AND AT LEAST A REAR DRIVING WHEEL

(75) Inventors: Gaetano Cocco, Torri di Quartesolo (IT); Andrea Raffaelli, Noale (IT); Leandro Scomazzon, Mira (IT)

(73) Assignee: Aprilia S.P.A., Noale (IT)

( * ) Notice: Subject to any disclaimer, the term of this patent is extended or adjusted under 35 U.S.C. 154(b) by 0 days.

(21) Appl. No.: 10/168,345

(22) PCT Filed: May 16, 2001

(86) PCT No.: PCT/EP01/05553
§ 371 (c)(1),
(2), (4) Date: Jun. 20, 2002

(87) PCT Pub. No.: WO01/92084
PCT Pub. Date: Dec. 6, 2001

(65) Prior Publication Data
US 2002/0190494 A1 Dec. 19, 2002

(30) Foreign Application Priority Data
Jun. 20, 2000 (IT) ................................ PN2000A0034

(51) Int. Cl.⁷ .............................................. B62D 61/06
(52) U.S. Cl. ................................... 180/210; 280/269
(58) Field of Search .................. 180/210; 280/269, 280/124, 103

(56) References Cited

U.S. PATENT DOCUMENTS

| 2,260,102 A | * | 10/1941 | Freret | 280/5.509 |
|---|---|---|---|---|
| 2,791,440 A | * | 5/1957 | Guidobaldi | 280/124.103 |
| 3,604,724 A | * | 9/1971 | Corbin | 280/124.103 |
| 3,692,324 A | * | 9/1972 | Corbin | 280/124.103 |
| 4,351,410 A | * | 9/1982 | Townsend | 180/210 |
| 4,360,224 A | * | 11/1982 | Sato et al. | 280/269 |
| 4,375,293 A | | 3/1983 | Solbes | |
| 4,546,997 A | * | 10/1985 | Smyers | 280/5.509 |
| 4,624,469 A | * | 11/1986 | Bourne, Jr. | 280/62 |
| 4,659,106 A | * | 4/1987 | Fujita et al. | 280/124.103 |
| 4,903,857 A | * | 2/1990 | Klopfenstein | 280/267 |
| 5,762,351 A | * | 6/1998 | SooHoo | 280/267 |
| 5,765,846 A | * | 6/1998 | Braun | 280/124.103 |
| 5,797,607 A | * | 8/1998 | Kopczynski | 280/6.154 |

FOREIGN PATENT DOCUMENTS

| AU | 14671 83 A | 12/1983 |
|---|---|---|
| GB | 2 155 410 | 9/1985 |
| GB | 2279047 | 12/1994 |
| WO | 99/47372 | 9/1999 |

* cited by examiner

Primary Examiner—Charles T. Jordan
Assistant Examiner—Bret Hayes
(74) Attorney, Agent, or Firm—Wenderoth, Lind & Ponack, L.L.P.

(57) ABSTRACT

A motor-vehicle has at least a rear driving wheel and two front rolling and steering wheels connected to each other by a linkage mechanism that is provided with a suspension system that comprises at least a pair of shock-absorbing struts and rocking levers associated therewith. An interconnecting latticework extending along a median plane of the vehicle supports an axis of pins of the rocking levers so that the axis is caused to lie on the median plane and parallel to axes of fulcrum pins of cross bars of the linkage mechanism.

21 Claims, 7 Drawing Sheets

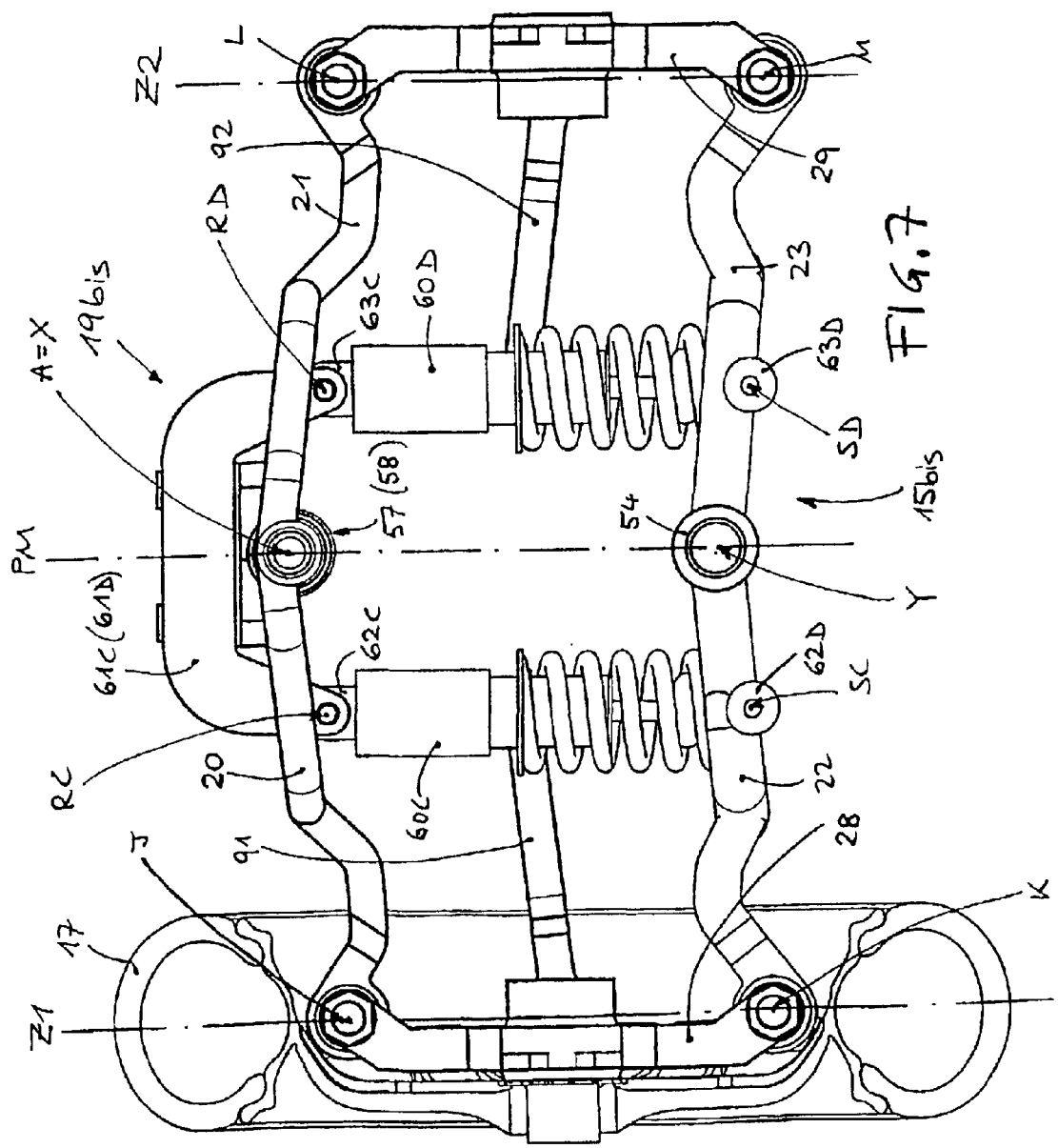

VEHICLES HAVING TWO FRONT ROLLING AND STEERING WHEELS AND AT LEAST A REAR DRIVING WHEEL

BACKGROUND OF THE INVENTION

The present invention pertains to a vehicle that is driven by an internal-combustion and/or electric engine, and comprises two front rolling and steering wheels and at least one rear driving wheel.

Prior art that can be considered as coming closest to the present invention is international patent application WO-A-99 41 136. In a three-wheel vehicle described therein, a linkage mechanism used to connect two front wheels with each other consists of two deformable trapeziums that, further to rigid members supporting spindles, is formed from two overlying pairs of cross arms provided with two articulated central fulcra.

To one of such pairs of cross arms, and therefore without any connection to a chassis of the vehicle, there are attached two end portions of a transverse shock-absorbing strut that comes into action when one of the two front wheels rises with respect to the other one.

To the contrary, when a driver forces the two front wheels to roll because of a simple displacement of his body (as in a two-wheel motor-cycle), for instance when taking a bend, the shock-absorbing strut is not subject to compression or relieving. The two central fulcra are in fact displaced with respect to a median longitudinal plane of the vehicle, but in each trapezium corresponding arms of the deformable trapeziums do not change their relative angle (to the contrary, they remain parallel to each other) and a center of gravity of the vehicle lowers as a function of solely a rolling angle, just as this occurs in a two-wheel vehicle. Transverse stability of the vehicle is ensured by the fact that steering axes, at Hooke's joints connecting spindles to a steering assembly, remain constantly perpendicular to axes of rotation of the respective front wheels.

Because of absence of any connection between the shock-absorbing strut and the chassis, as well as considerable inertia of parts forming the linkage mechanism with respect to axes of the two central fulcra of the cross arms, this prior-art vehicle tends to be rather slow in responding to commands of a driver, so that it is actually rather difficult to drive. This is practically prejudicial to a possibility of equipping the vehicle, even and much more so on an optional basis, with a protective covering or a roll bar due to difficulty found by a design engineer to anticipate or predict all possible states of the vehicle when the front wheels thereof are rolling. Furthermore, an unavoidable presence of a bottom cross arm between equatorial planes of the front wheels and the respective steering axes thereof may have adverse consequences in a case of sharp braking, because of link rods of the steering assembly becoming greatly stressed thereby.

SUMMARY OF THE INVENTION

It therefore is a main purpose of the present invention to provide a vehicle with two front rolling and steering wheels, which, further to ensuring a greater extent of comfort as compared with a traditional motor-cycle, is free from the above drawbacks and is therefore capable of being equipped, even on an optional basis, with various types of protective coverings or roll bars. A further purpose of the present invention is to provide, albeit within certain limits, a simple and low-cost construction of the vehicle as compared to a traditional construction of two-wheel vehicles.

According to the present invention, these and further aims are reached in a vehicle having characteristics as recited in the appended claims, which vehicle uses a pair of shock-absorbing struts and an associated rocker-arm structure through which a chassis supports a cross-bar linkage mechanism that connects two front rolling and steering wheels to each other.

In this connection, the Applicant does not consider such prior publications as the U.S. Pat. Nos. 4,003,443, 4,887,829, 5,611,555, as well as patent applications WO-A-97 27 071, WO-A-98 43 872, as being of any relevance since, in vehicles having a single front steering wheel, shock-absorbing struts are featured which are associated with more or less horizontal fork members supporting two rear rolling, but not steering wheels.

In any event, features and advantages of the present invention will be more readily understood from a description that follows by way of non-limiting examples with reference to accompanying drawings, in which it should be noticed that, for reasons of greater simplicity, both the description and the drawings are substantially limited to those construction parts of a vehicle which are directly concerned with the present invention or are in any way useful in view of being able to explain a manner by which the invention actually works. As a result, references to other component parts (such as for instance driving engine, tanks, radiator, electric components, steering assembly and the like), which may be of a fully traditional type, are intentionally omitted.

BRIEF DESCRIPTION OF THE DRAWINGS

FIG. 7 is a view illustrating a second embodiment of the present invention and referring to a vehicle state corresponding to that shown in FIG. 5.

DETAILED DESCRIPTION OF THE PREFERRED EMBODIMENTS

Figure 1:
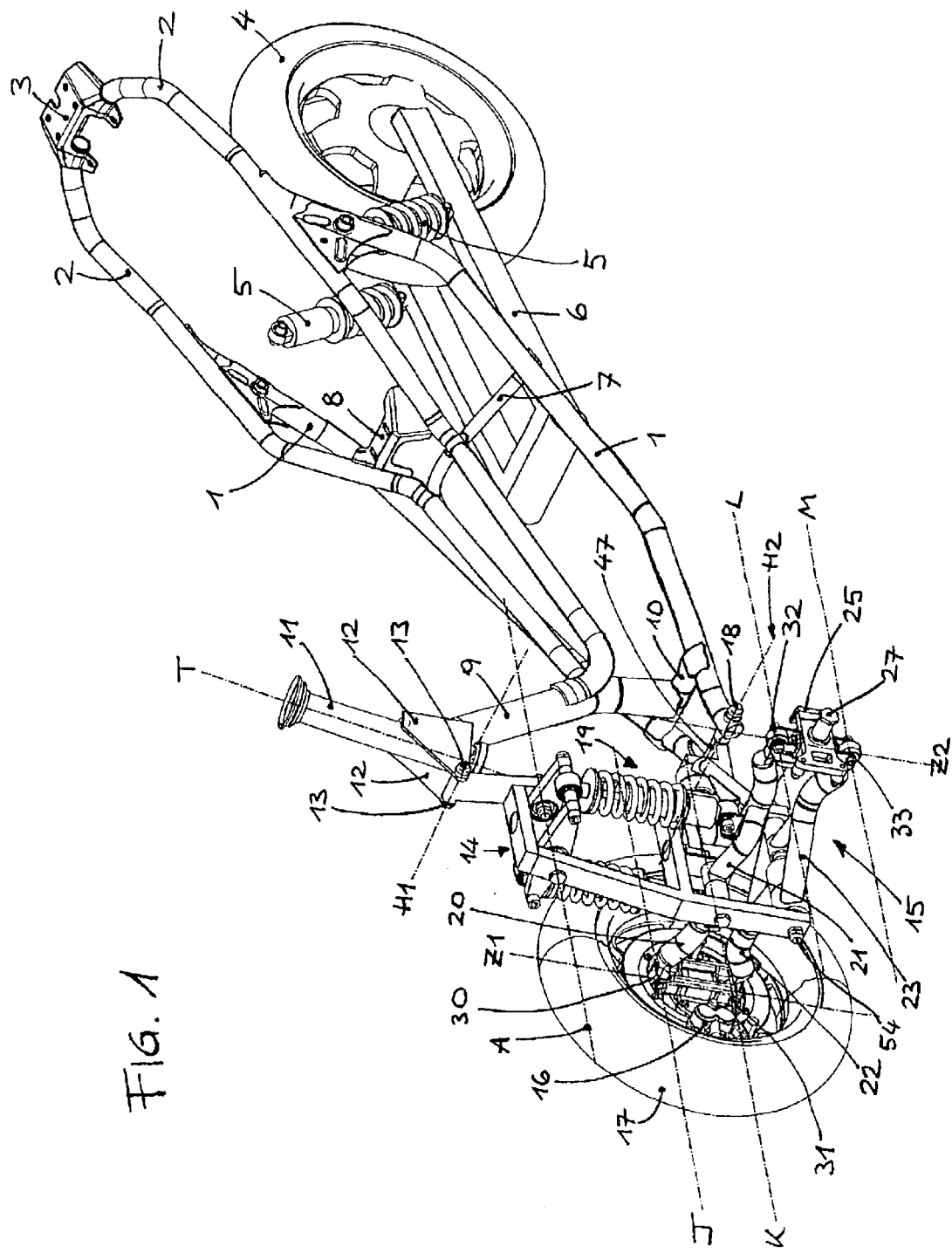
FIG. 1 is a three-dimensional overall view of a first embodiment of a vehicle with two front rolling and steering wheels.

As shown in FIG. 1, part of a rigid chassis of a vehicle includes a first pair of longitudinal tubes 1 and a second pair of longitudinal tubes 2, wherein the longitudinal tubes of the second pair are longer and arranged at a higher position than those of the first pair. The tubes 2 are joined to each other at a rear side by virtue of a first bracket 3 and, a little further on, they are welded on to a rear end portion of the tubes 1 near suspension points of a pair of shock-absorbing struts 5 which, with a C-shaped fork member 6 hinged to the tubes 1, are part of a suspension system of a rear driving wheel 4.

A transverse tube 7 in a shape of a reversed U, arranged practically below a second bracket 8 which connects the tubes 2 to each other, forms another joining structure between the two pairs of tubes of the chassis.

A main descending tube 9 of the chassis is welded at its bottom to a cross ember 10 that connects the tubes 1 to each other near a front end portion thereof, and at its top to head 11 of a steering gear, so that an axis T of the head 11 is inclined by approximately 25° with respect to the vertical. And, a pair of brackets 12 supports a pair of bushings 13.

Figure 2:
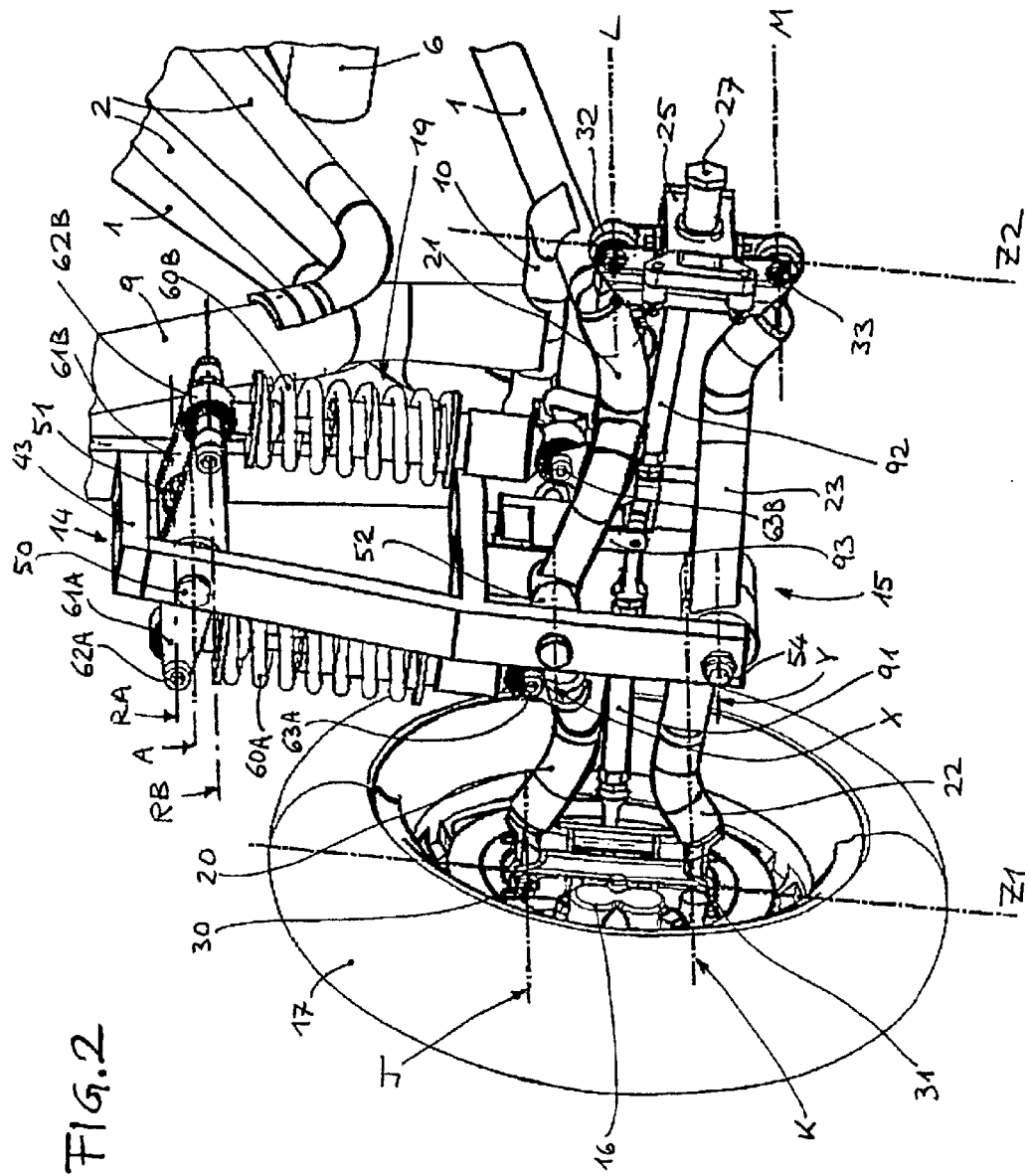
FIG. 2 is a view showing on a greater scale, and in a slightly different perspective, only a portion of the vehicle illustrated in FIG. 1 in order to better highlight details of a linkage mechanism connecting the two front wheels with each other.

The vehicle comprises two front wheels, of which only right-hand one 17 is shown in FIGS. 1 and 2, with a related brake shoe 16, for reasons of greater simplicity. The front wheels are steered about respective steering axes Z1, Z2 that are inclined by approximately 15° with respect to the vertical, and are rolled via a linkage mechanism generally indicated at 15, which ensures mutual connection thereof.

As illustrated in FIGS. 3 through 6, the linkage mechanism 15 comprises:

two pairs of rigid transverse bars (20, 21) and (22, 23) arranged one above another and provided with central fulcra along axes X and Y, respectively, that are parallel to each other and lie on median plane PM of the vehicle. When seen from above, the transverse bars appear to be of a bifurcate shape so as to be able to obtain required rigidity to oppose shocks and stresses acting in a longitudinal direction of the vehicle, which shocks and stresses may result from, for instance, a single wheel being braked or the vehicle being exposed to frontal shocks, as well as to oppose stresses that are directed vertically. Upper bars 20, 21 are also a part of a suspension system, which is generally indicated at 19 and is described in greater detail further on;

rigid members 24, 25 that carry, by virtue of appropriate interfacing bearings, spindles 26, 27 of the two front wheels; and two pairs of ball-and-socket joints (30, 31) and (32, 33) (that have an advantage of enabling tolerances, allowed for or introduced in processing or manufacturing various parts of the linkage mechanism 15, to be compensated for) provided at interconnection points between the bars 20, 21, 22 and 23 and the rigid members 24, 25.

According to the present invention, centers of the ball-and-socket joints are aligned along the steering axes Z1 and Z2, and rolling axes J, K and L, M lie on equatorial planes of respective ones of the front wheels, which planes are parallel to the median plane PM of the vehicle. The two front wheels have in this way a forward stroke that has wellknown stabilizing effects on the vehicle, since generated is a pull-in or biasing force that increases with a steering extent.

Of a steering assembly, which is a part of the vehicle with which the present invention is not directly concerned, the accompanying drawings solely illustrate in FIG. 2 tie-rods 91, 92 that connect the rigid members 24, 25, supporting the spindles 26, 27, to a brace 93 actuated by the head 11 of the steering gear via mechanical transmissions (not shown).

According to another feature of the present invention, a lattice-like structure or open framework, which is generally indicated at 14, ensures interconnection between the chassis and the linkage mechanism 15, and also supports a pin of the brace 93, which brace 93 is used as a connection device between the tie-rods 91 and 92 of the steering assembly.

Figure 3:
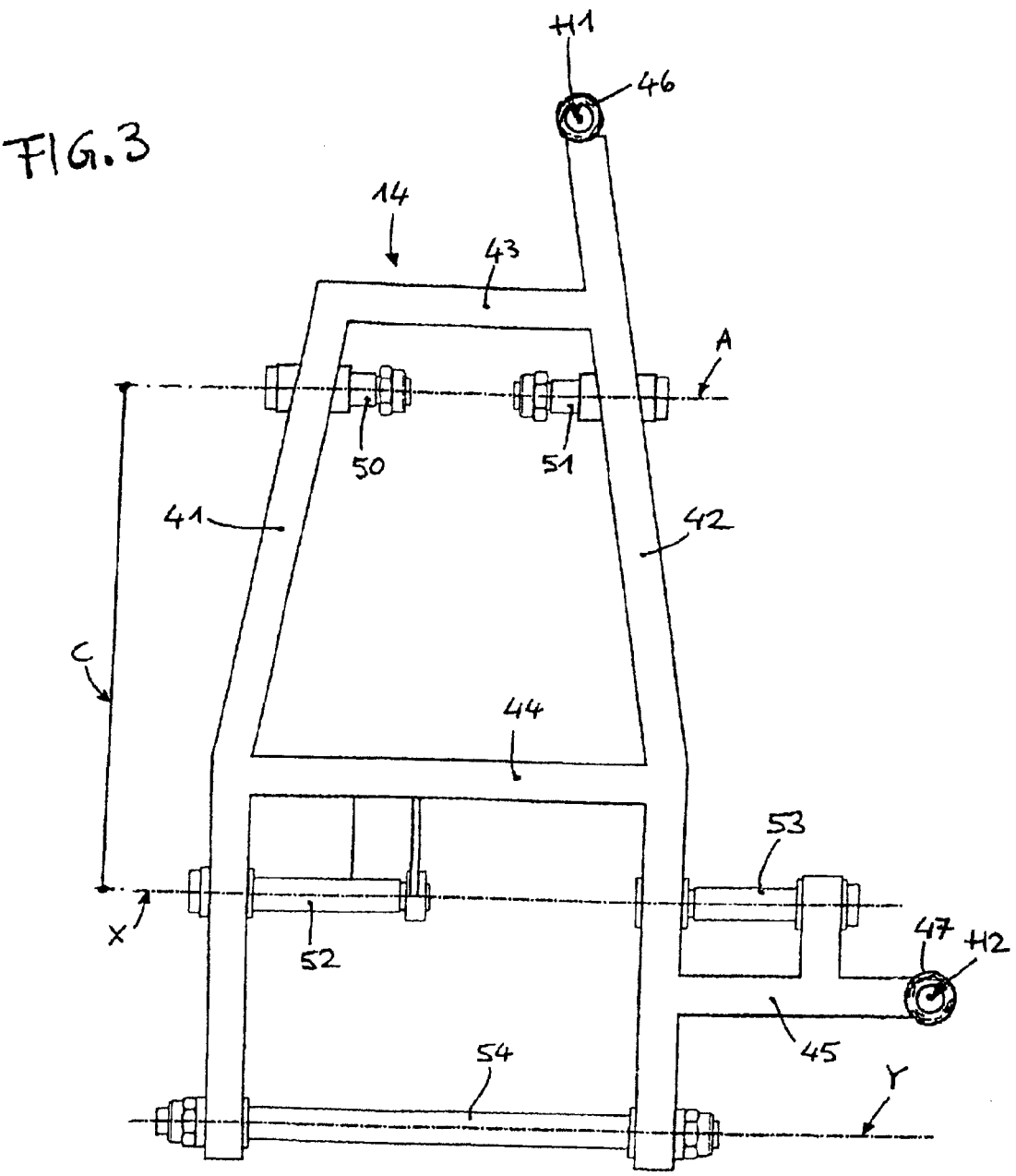
FIG. 3 is a side view of a structure used to interconnect a chassis and the linkage mechanism of the vehicle illustrated in FIG. 1.

As clearly shown in FIG. 3, the lattice-like structure 14 extends in the median plane PM of the vehicle and consists substantially of a front riser 41 and a rear riser 42, to which there are butt-welded, one above another, a first longitudinal beam 43 and a second longitudinal beam 44. To the rear riser 42 there is further welded a backward protruding bracket 45.

On top of the rear riser 42 there is attached a first pin 46, which is provided to allow for coupling, along an axis H1 of the first pin, to the bushes 13 that are provided integral with the descending tube 9 of the chassis. To a free end portion of the bracket 45 there is attached a second pin 47, which is provided to allow for coupling, along an axis H2 of the second pin, with a pair of bushings (of which only a left-hand one is shown in FIG. 1 as 18) that are provided at a front end portion of the longitudinal tubes 1 of the chassis. The axes H1, H2 of the pins 46, 47 are therefore perpendicular to the median plane PM of the vehicle and the equatorial planes of the two front wheels.

As illustrated in FIG. 3, the risers 41, 42 of the lattice-like structure 14 support:

below the longitudinal beam 44, central fulcrum pins 52, 53 (aligned along axis X) of the upper bars 20, 21 of the linkage mechanism 15; and at the lower end portion thereof, central fulcrum pin 54 (aligned along axis Y) of the lower bars 22, 23 of the linkage mechanism 15.

As already pointed out earlier in this description, the linkage mechanism 15 used to interconnect the two front wheels is provided with a suspension system 19, which suspension system comprises a pair of shock-absorbing struts 60A, 60B, and two rocking levers 61A, 61B that are hinged with their central fulcra to the lattice-like structure 14 by virtue of pins 50, 51 that are attached below the upper beam 43, as shown in FIG. 3. The pins 50, 51 are aligned along inclined axis A, which is parallel to the axes X, Y and within the median plane PM of the vehicle. A distance between the axes A and X, indicated at C in FIG. 3, is in this way fixed.

Figure 4:
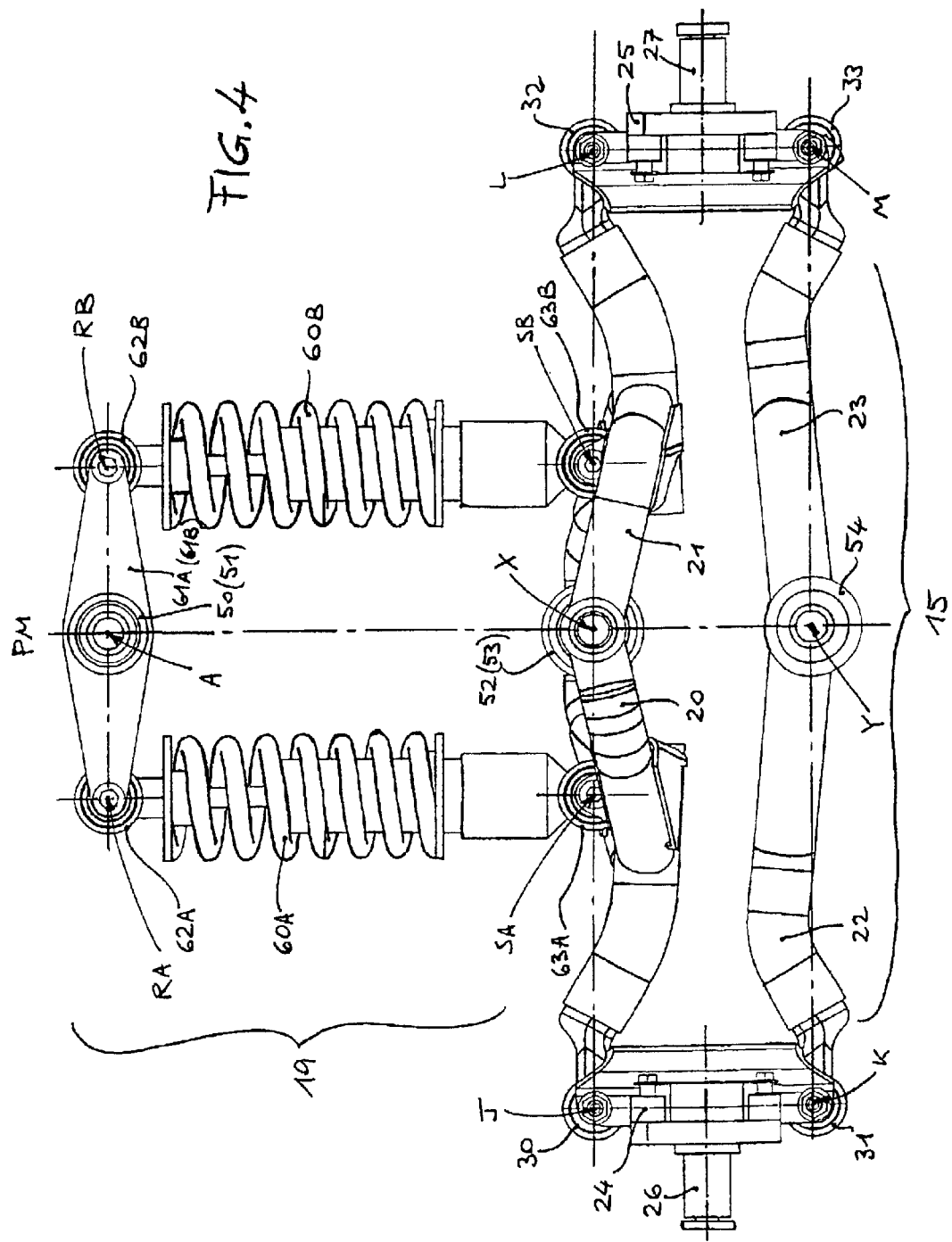
FIG. 4 is a front view of the linkage mechanism in a no-load, ie. resting state (static state) of the vehicle.
Figure 5:
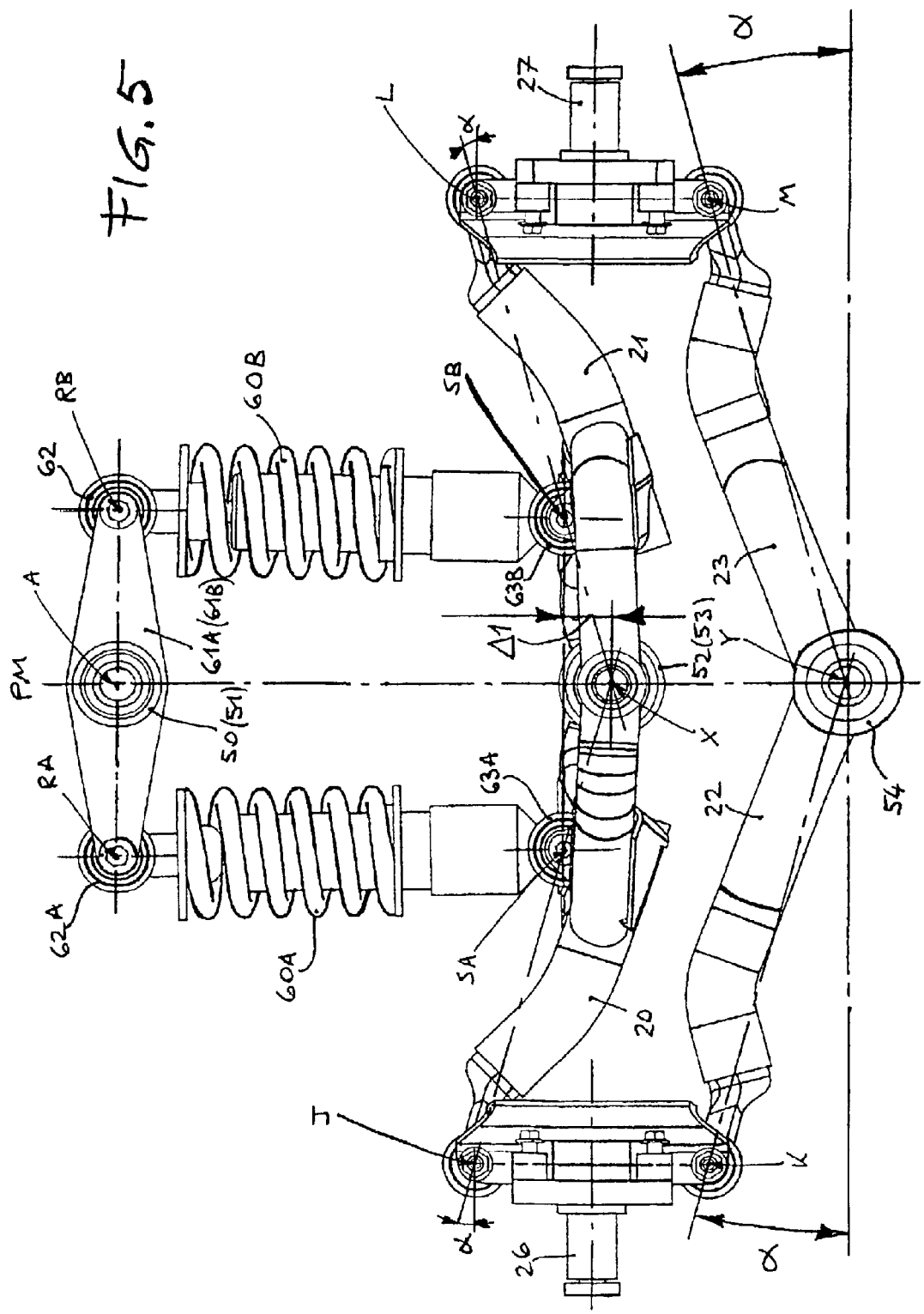
FIG. 5 is a similar view as FIG. 4, but referring to a first dynamic state of the vehicle (i.e. vehicle moving under load conditions along a rectilinear route)
Figure 6:
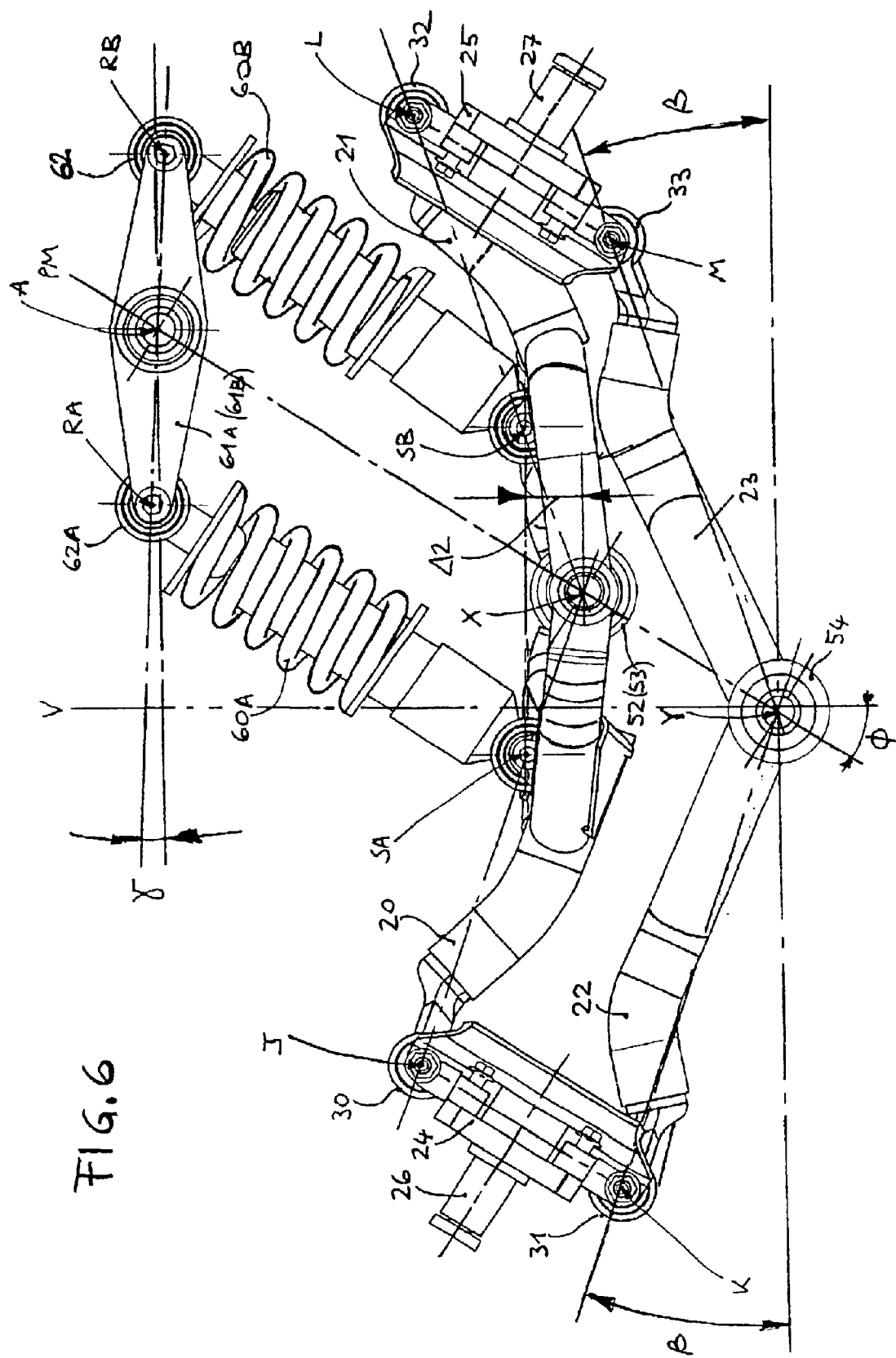
FIG. 6 is a view referring to a second dynamic state of the vehicle (i.e. vehicle that, further to being under load conditions, is taking a bend)

The shock-absorbing struts 60A, 60B are suspended at their tops to opposite end portions of the rocking levers 61A, 61B, respectively, by virtue of respective first gudgeon pins 62A and 62B and, in a first embodiment (as illustrated in FIGS. 4 to 6) the shock-absorbing struts are connected at their bottoms, by virtue of respective second gudgeon pins 63A and 63B, to the upper bars 20 and 21, respectively, of the linkage mechanism 15. Axes RA, RB and SA, SB of the gudgeon pins are therefore parallel to each other, as well as parallel to the axes A, X, Y.

Because of the above described and explained contrivances, for a vehicle according to the present invention a design engineer has a possibility of favoring rather than limiting, rolling speed of the wheels in view of enabling the vehicle to be driven in a more sporting, i.e. racing-like, than a touring or usual travelling manner in presence of a protective covering or roll bar, in an extremely simple manner. To do this, no need actually arises for variants to be introduced in either the linkage mechanism 15 or the lattice-like structure 14. To this end, it is in fact sufficient solely for more or less long shock-absorbing struts to be selected for the suspension system 19 in view of obtaining a controlled behavior during various states that the vehicle is likely to achieve. As already pointed out, the distance C between the fulcrum axes A of the rocking levers of the suspension system 19 and the axis X of the upper bars 20 and 21 of the linkage mechanism 15, as well as a distance between the axis X and parallel and co-planar fulcrum axis Y of the lower bars 22, 23 of the linkage mechanism 15, remain rigorously fixed thanks to utilization of the lattice-like structure 14.

In view of better illustrating a manner by which all this works, for reasons of greater simplicity, only the linkage mechanism 15 interconnecting the front wheels is shown in the accompanying drawings, along with related suspension system 19, for three significant states of the vehicle.

An assumption is that a design engineer has to design a vehicle that is intended to be used at least prevailingly for racing or similar purposes. In this case, shock-absorbing struts 60A, 60B are selected which, in a static state of the vehicle (i.e. vehicle resting on ground under no load conditions —see FIG. 4), have a length which is equal to the fixed distance C between the axes A and X. This means that, if distances between the axes RA, SA of the gudgeon pins 62A, 63A and the axes RB, SB of the gudgeon pins 62B, 63B are referred to as A0 and B0, respectively, the relation A0=B0=C applies.

In the above cited static state of the vehicle, the shock-absorbing struts 60A, 60B are not loaded, so that:

the median plane PM of the vehicle, as well as the equatorial planes of the front wheels, which are parallel to the median plane, are arranged vertically;

the wheels are provided with a forward stroke because of the afore-mentioned inclination of the steering axes Z1, Z2 with respect to the vertical; and the axes of the spindles 26, 27 (and, therefore, axes of rotation of the wheels) are horizontal.

FIG. 5 refers to a first dynamic state of the vehicle, and namely to a vehicle running along a rectilinear course. Because of static and dynamic loads that weigh on the front wheels, the shock-absorbing struts 60A and 60B are maintained vertical; however, the shock-absorbing struts undergo a contraction $\Delta 1$, i.e. become shorter by an extent $\Delta 1$ with respect to the fixed distance C between the axes A and X. In other words, the relation $A1=(A0-\Delta 1)=B1=(B0-\Delta 1)<C$ now applies for distance Al between the axes RA, SA, and distance B1 between the axes RB, SB of the gudgeon pins 62A, 63A and 62B, 63B, respectively. As result:

the equatorial planes of the front wheels remain parallel to the median plane PM of the vehicle, while inclination of the steering axes Z1, Z2 with respect to the vertical, in the planes undergoes a slight either positive or negative variation under a corresponding slight variation of the forward stroke (due to an effect of a different lowering extent of both the suspension system 19 and the rear wheel 4), which brings about a slight forward or rearward inclination of the vehicle, when seen from a side, with respect to the static state thereof as illustrated in FIG. 4;

the bars 20, 21, 22, 23 of the linkage mechanism 15 incline upwardly by a certain angle a relative to the horizontal, as is clearly shown by disposition of geometrical axes thereof (which are straight lines, formed by four planes defined by the axes J and X, K and Y, L and X, M and Y, respectively, intersecting a plane of FIGS. 4 to 6);

the median plane PM of the vehicle maintains in a vertical arrangement, and axes of rotation of the front wheels remain horizontal; and the rocking levers 61A, 61B remain horizontal.

FIG. 6 refers to a second dynamic state of the vehicle, i.e. a state that is typical for a sporting kind of driving, when the vehicle is running through a bend so that a rolling effect takes place, which practically means an angular displacement of the median plane PM, which contains the axes A, X and Y, by $\Phi$ with respect to the vertical V. In order to assure required safety of the vehicle, a need is still felt for both the wheel mounted on the spindle 26 running on an extrados of the bend, and the wheel mounted on the spindle 27 running on an intrados of the bend, to be maintained in contact with the ground. In this case, the shock-absorbing struts 60A and 60B are shorter than the distance C (FIG. 3) and so determine a different deformation of a quadrilateral supporting the left-hand wheel and the one supporting the right-hand wheel. Distances between the axes RA, SA and RB, SB of the gudgeon pins 62A, 63A and 62B, 63B change to a value $A2=(A0-\Delta 2)=B2=(B0-\Delta 2)<C$ because of a rotation about the axis A of the rocking levers 61A, 61B toward an interior of the bend by a certain angle $\gamma$. Upward inclination of the bars 30, 31, 32, 33 of the linkage mechanism 15 is therefore greater than rolling angle $\Phi$ assuming a value $\beta=\Phi+\gamma*\tau$ where $\tau$ is a geometrical ratio linking an arm of a vertical load on a wheel and an arm of an actual force acting on the respective shock-absorber strut.

As opposed to the afore-mentioned prior-art vehicle, the shock-absorber struts 60A, 60B of the suspension system 19 according to the present invention work by forcing the linkage mechanism 15 to behave in a different manner according to a position of the median plane PM, i.e. between an intrados of a bend (corresponding to the right-hand side of FIG. 6) and an extrados of a bend (corresponding to the left-hand side of FIG. 6). A parallelogram having intersections of the rolling axes X, Y, L, M with the plane of FIG. 6 as its vertices closes in to a greater extent than a parallelogram having intersections of the axes J, K, X, Y with the same plane as its vertices. An engineer designing a vehicle obtains in this way an increase in rolling speed of the front wheels and, as a result, a better placement when bending (which is clearly advantageous when driving a vehicle as in racing), while increasing safety at the same time.

Conversely, in a case of a vehicle provided with a protective covering (which has an effect of increasing an inertia thereof with respect to a bottom rolling axis) a design engineer has to solely select shock-absorbing struts 60A, 60B of suspension system 19 in such a manner as to obtain that, during a static state of the vehicle, the relation A0=B0>C applies and, notwithstanding their becoming shorter, distances between the axes of the gudgeon pins remain greater than, or at least equal to, the distance C between the axes A and X even during a dynamic state of the vehicle shown in FIG. 6. In this case, a parallelogram having the intersections of the axes X, Y, L, M with the plane of FIG. 6 as its vertices (i.e. in correspondence of an intrados of a bend) closes in to a lesser extent than a parallelogram having the intersections of the axes J, K, X, Y with the same plane as its vertices (i.e. in correspondence of an extrados of the bend), so that a slowing down of rolling speed is obtained, which in turn effectively opposes a natural lowering of a center of gravity and does away with risks connected with the above-mentioned greater inertia.

This is why a vehicle according to the present invention proves to be easy and safe to drive during all states that it may take when running on a road, and regardless of a manner in which it is driven, i.e. racing or normal travelling, and also when the vehicle is equipped, although occasionally, with a protective covering or a roll-bar.

For reasons of greater simplicity, a second embodiment of the present invention (see FIG. 7, which again refers to the same state of the vehicle as the one shown in FIG. 5) is described here solely as far as differences with respect to the first described embodiment are concerned, whereas same reference numerals as in the above description are used to indicate parts that remain conceptually unaltered.

Linkage mechanism 15bis differs from linkage mechanism 15 in that, for each one of the two front steering and rolling wheels, spindle-carrying members and spindles are integral with each other, so as to form a single piece indicated at 28, 29, respectively, in view of eliminating a need for respective interfacing bearings to be used.

In the suspension system 19bis of the linkage mechanism 15bis, rocking levers 61C, 61D supporting shock-absorbing struts 60C, 60D are in a shape of an overturned U and use central fulcra 57, 58 of the upper bars 20, 21, so that axis A coincides with axis X and, from a construction point of view, a simplification of lattice-like structure 14 is obtained. First (upper) gudgeon pins 62C and 63C of the shock-absorbing struts 60C, 60D are located at free end portions of the levers 61C, 61D, whereas second (lower) gudgeon pins 62D and 63D are attached to lower bars 22 and 23, with a central fulcrum axis of the lower bars remaining axis Y.

A manner by which this embodiment works is still the same as the one described in connection with the first embodiment, which practically means that, during various states of the vehicle, distance C between central fulcrum axes X (or A) and Y remains rigorously fixed, whereas, in accordance with options that a design engineer will from time to time select to use, lengths of the shock-absorbing struts 60C, 60D, i.e. distances between axes RC, RD of the gudgeon pins 62C and 63C and axes SC, SD of the gudgeon pins 62D and 63D, vary accordingly.

Functional advantages offered by this vehicle over the prior-art considered in this connection can be clearly appreciated from the above description, along-with far greater simplicity of construction thereof.

It will be further appreciated that a number of different variants and embodiments of the present invention may be developed without departing from the scope of the present invention as defined by the appended claims. These may for instance include a vehicle with two rear driving wheels, which are obviously neither rolling nor steering wheels, as well as a four-wheel vehicle with rear wheels that are not steering wheels, but rather rolling wheels.

What is claimed is:

1. A vehicle comprising:
    a rigid chassis;
    a rear driving wheel;
    two front steering wheels;
    a linkage mechanism interconnecting said two front steering wheels, said linkage mechanism including
        (i) a first rigid cross bar having a first fulcrum axis, and a second rigid cross bar having a second fulcrum axis that is coincident with said first fulcrum axis,
        (ii) a third rigid cross bar having a third fulcrum axis, and a fourth rigid cross bar having a fourth fulcrum axis that is coincident with said third fulcrum axis, and
        (iii) a suspension system including
            (a) a first shock absorbing strut having an upper end portion connected to a first end of a first rocking lever at a first connecting point and also to a first end of a second rocking lever at a second connecting point, and having a lower end portion connected to said first rigid cross bar at a third connecting point, with said first and second connecting points defining a first line,
            (b) a second shock absorbing strut having an upper end portion connected to a second end of said first rocking lever at a fourth connecting point and also to a second end of said second rocking lever at a fifth connecting point, and having a lower end portion connected to said second rigid cross bar at a sixth connecting point, with said fourth and fifth connecting points defining a second line,
            (c) an interconnecting structure connected to said rigid chassis, with said first rocking lever being connected to said interconnecting structure so as to pivot relative to said interconnecting structure about a fifth fulcrum axis, and with said second rocking lever being connected to said interconnecting structure so as to pivot relative to said interconnecting structure about a sixth fulcrum axis that is coincident with said fifth fulcrum axis,
    with said first fulcrum axis being co-planar with each of said third fulcrum axis and said fifth fulcrum axis, and with each of said first fulcrum axis, said third fulcrum axis and said fifth fulcrum axis being in a median plane of the vehicle when the vehicle is at rest;
    a first rigid wheel-supporting member connected to said first rigid cross bar via a first ball and socket joint having a first rolling axis, and connected to said third rigid cross bar via a second ball and socket joint having a second rolling axis, with said first and second rolling axes being parallel to said median plane when the vehicle is at rest; and
    a second rigid wheel-supporting member connected to said second rigid cross bar via a third ball and socket joint having a third rolling axis, and connected to said fourth rigid cross bar via a fourth ball and socket joint having a fourth rolling axis, with said third and fourth rolling axes being parallel to said median plane when the vehicle is at rest,
    such that during various states of the vehicle a distance between said first fulcrum axis and said fifth fulcrum axis remains fixed, while a distance between said first line and said third connecting point varies and while a distance between said second line and said sixth connecting point varies.

2. The vehicle according to claim 1, wherein
    said first rocking lever is constructed and arranged to pivot about said fifth fulcrum axis and said second rocking lever is constructed and arranged to pivot about said sixth fulcrum axis such that for a rolling angle $\Phi$ of said two front steering wheels relative to a vertical plane, said first, second, third and fourth rigid cross bars exhibit an inclination angle $\beta$ relative to a horizontal plane, and said first and second rocking levers exhibit a rotation angle $\gamma$ relative to a horizontal plane, with the inclination angle $\beta$ being greater than the rolling angle $\Phi$ and correlated with the rotation angle $\gamma$.

3. The vehicle according to claim 2, wherein
    a center of said first ball and socket joint and a center of said second ball and socket joint are each aligned a steering axis of one of said two front steering wheels,
    a center of said third ball and socket joint and a center of said fourth ball and socket joint are each aligned a steering axis of the other of said two front steering wheels,
    said first and second rolling axes are each in an equatorial plane of said one of said two front steering wheels, and
    said third and fourth rolling axes are each in an equatorial plane of said other of said two front steering wheels,
    with said equatorial plane of said one of said two front steering wheels and said equatorial plane of said other of said two front steering wheels each being parallel to said median plane.

4. The vehicle according to claim 3, wherein
    said steering axis of said one of said two front steering wheels and said steering axis of said other of said two front steering wheels are each inclined relative to a vertical plane so as to confer a forward stroke to said two front steering wheels.

5. The vehicle according to claim 1, wherein
a center of said first ball and socket joint and a center of said second ball and socket joint are each aligned a steering axis of one of said two front steering wheels,
a center of said third ball and socket joint and a center of said fourth ball and socket joint are each aligned a steering axis of the other of said two front steering wheels,
said first and second rolling axes are each in an equatorial plane of said one of said two front steering wheels, and
said third and fourth rolling axes are each in an equatorial plane of said other of said two front steering wheels,
with said equatorial plane of said one of said two front steering wheels and said equatorial plane of said other of said two front steering wheels each being parallel to said median plane.

6. The vehicle according to claim 5, wherein
said steering axis of said one of said two front steering wheels and said steering axis of said other of said two front steering wheels are each inclined relative to a vertical plane so as to confer a forward stroke to said two front steering wheels.

7. The vehicle according to claim 1, wherein
said first rigid cross bar is connected to said interconnecting structure by a first pin, with an axis of said first pin corresponding to said first fulcrum axis,
said second rigid cross bar is connected to said interconnecting structure by a second pin, with an axis of said second pin corresponding to said second fulcrum axis,
said first rocking lever is connected to said interconnecting structure by a third pin, with an axis of said third pin corresponding to said fifth fulcrum axis, and
said second rocking lever is connected to said interconnecting structure by a fourth pin, with an axis of said fourth pin corresponding to said sixth fulcrum axis.

8. The vehicle according to claim 7, wherein
said third and fourth rigid cross bars are connected to said interconnecting structure by a fifth pin, with an axis of said fifth pin corresponding to said third and fourth fulcrum axes, and
said first fulcrum axis is parallel to each of said third fulcrum axis and said fifth fulcrum axis.

9. The vehicle according to claim 7, wherein
said interconnecting structure comprises an open framework including a first beam spaced from and connected to a second beam, with said second beam being positioned between said first beam and said rear driving wheel, and with said median plane passing between said first and second beams.

10. The vehicle according to claim 9, wherein
said first rocking lever is constructed and arranged to pivot about said fifth fulcrum axis and said second rocking lever is constructed and arranged to pivot about said sixth fulcrum axis such that for a rolling angle $\Phi$ of said two front steering wheels relative to a vertical plane, said first, second, third and fourth rigid cross bars exhibit an inclination angle $\beta$ relative to a horizontal plane, and said first and second rocking levers exhibit a rotation angle $\gamma$ relative to a horizontal plane, with the inclination angle $\beta$ being greater than the rolling angle $\Phi$ and correlated with the rotation angle $\gamma$.

11. The vehicle according to claim 10, wherein
a center of said first ball and socket joint and a center of said second ball and socket joint are each aligned a steering axis of one of said two front steering wheels,
a center of said third ball and socket joint and a center of said fourth ball and socket joint are each aligned a steering axis of the other of said two front steering wheels,
said first and second rolling axes are each in an equatorial plane of said one of said two front steering wheels, and
said third and fourth rolling axes are each in an equatorial plane of said other of said two front steering wheels,
with said equatorial plane of said one of said two front steering wheels and said equatorial plane of said other of said two front steering wheels each being parallel to said median plane.

12. The vehicle according to claim 11, wherein
said steering axis of said one of said two front steering wheels and said steering axis of said other of said two front steering wheels are each inclined relative to a vertical plane so as to confer a forward stroke to said two front steering wheels.

13. The vehicle according to claim 9, wherein
a center of said first ball and socket joint and a center of said second ball and socket joint are each aligned a steering axis of one of said two front steering wheels,
a center of said third ball and socket joint and a center of said fourth ball and socket joint are each aligned a steering axis of the other of said two front steering wheels,
said first and second rolling axes are each in an equatorial plane of said one of said two front steering wheels, and
said third and fourth rolling axes are each in an equatorial plane of said other of said two front steering wheels,
with said equatorial plane of said one of said two front steering wheels and said equatorial plane of said other of said two front steering wheels each being parallel to said median plane.

14. The vehicle according to claim 13, wherein
said steering axis of said one of said two front steering wheels and said steering axis of said other of said two front steering wheels are each inclined relative to a vertical plane so as to confer a forward stroke to said two front steering wheels.

15. The vehicle according to claim 9, wherein
said first beam is connected to said second beam via a third beam and a fourth beam, with said third and fourth beams extending transversely relative to said first and second beams.

16. The vehicle according to claim 15, wherein
said first rocking lever is constructed and arranged to pivot about said fifth fulcrum axis and said second rocking lever is constructed and arranged to pivot about said sixth fulcrum axis such that for a rolling angle $\Phi$ of said two front steering wheels relative to a vertical plane, said first, second, third and fourth rigid cross bars exhibit an inclination angle $\beta$ relative to a horizontal plane, and said first and second rocking levers exhibit a rotation angle $\gamma$ relative to a horizontal plane, with the inclination angle $\beta$ being greater than the rolling angle $\Phi$ and correlated with the rotation angle $\gamma$.

17. The vehicle according to claim 2, wherein
a center of said first ball and socket joint and a center of said second ball and socket joint are each aligned a steering axis of one of said two front steering wheels,
a center of said third ball and socket joint and a center of said fourth ball and socket joint are each aligned a steering axis of the other of said two front steering wheels, said first and second rolling axes are each in an equatorial plane of said one of said two front steering wheels, and said third and fourth rolling axes are each in an equatorial plane of said other of said two front steering wheels, with said equatorial plane of said one of said two front steering wheels and said equatorial plane of said other of said two front steering wheels each being parallel to said median plane.

18. The vehicle according to claim 17, wherein said steering axis of said one of said two front steering wheels and said steering axis of said other of said two front steering wheels are each inclined relative to a vertical plane so as to confer a forward stroke to said two front steering wheels.

19. The vehicle according to claim 15, wherein a center of said first ball and socket joint and a center of said second ball and socket joint are each aligned a steering axis of one of said two front steering wheels, a center of said third ball and socket joint and a center of said fourth ball and socket joint are each aligned a steering axis of the other of said two front steering wheels, said first and second rolling axes are each in an equatorial plane of said one of said two front steering wheels, and said third and fourth rolling axes are each in an equatorial plane of said other of said two front steering wheels, with said equatorial plane of said one of said two front steering wheels and said equatorial plane of said other of said two front steering wheels each being parallel to said median plane.

20. The vehicle according to claim 19, wherein said steering axis of said one of said two front steering wheels and said steering axis of said other of said two front steering wheels are each inclined relative to a vertical plane so as to confer a forward stroke to said two front steering wheels.

21. The vehicle according to claim 1, wherein said third fulcrum axis is coincident with said fifth fulcrum axis.

* * * * *